Jan. 10, 1933.  F. L. MICHAELS  1,893,956
STORE FRONT COUPLING
Filed March 11, 1931
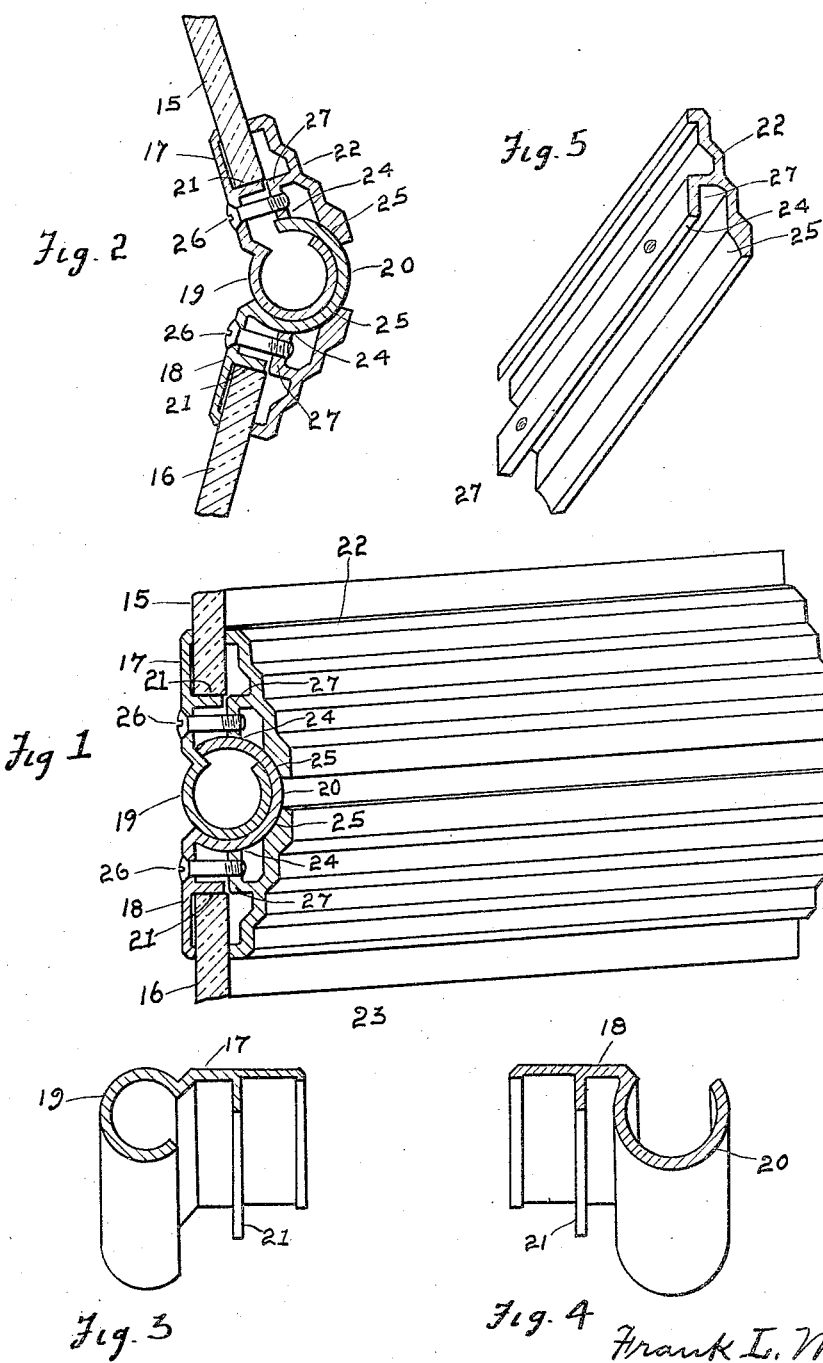
Frank L. Michaels,
INVENTOR
BY C. W. Miles,
ATTORNEY Patented Jan. 10, 1933

1,893,956

UNITED STATES PATENT OFFICE

FRANK L. MICHAELS, OF COVINGTON, KENTUCKY

STORE FRONT COUPLING

Application filed March 11, 1931. Serial No. 521,677.

My invention relates to improvements in joint or coupling members for the glass plates of store fronts and similar structures. One of its objects is to provide an improved joint or coupling member for glass plates adapted to be constructed and assembled from stock bars of extruded metal from which sections of the desired length may be cut as required. Another object is to provide a joint or coupling for glass plates adapted to be formed from stock bars of extruded metal and which are adapted to be adjustable to different degrees of angularity as may be required, and which once adjusted to position may be clamped and rendered rigid and resistant to further adjustment. Another object is to provide extruded stock bars for the above purpose which are adapted to be interengaged telescopically to hinge one of said bars with a closed joint upon and relative to the other bar. My invention also comprises certain details of form and arrangement, and combination of components, all of which will be fully set forth in the description of the accompanying drawing, in which:

Fig. 1 is a cross sectional view partly in perspective, showing a metal store front joint or coupling between two glass plates embodying my improvements.

Fig. 2 is a cross sectional view similar to Fig. 1 showing a different position of angular adjustment.

Fig. 3 is a sectional view, partly in perspective, of one of the hinge joint members detached.

Fig. 4 is a sectional view partly in perspective of the opposite hinge joint member detached.

Fig. 5 is a sectional view, partly in perspective of one of the joint clamping members detached.

The accompanying drawing illustrates one embodiment of my invention in which 15 and 16 represent two sheets or panes of plate glass such as are employed in store fronts and for similar purposes, and which are mounted in a frame and require their adjacent edges to be united and relatively supported by a metal joint or coupling forming part of the frame in which the panes are mounted. These panes may be in substantially one plane as shown in Fig. 1, or may occupy different planes as indicated in Fig. 2, and it is therefore desirable to have the joint members relatively adjustable to different positions of angularity.

The coupling comprises rods or bars of extruded metal 17 and 18. The member 17 is provided with a nearly complete cylindrical section 19, and the member 18 with a nearly complete cylindrical section 20. The exterior of the cylindrical section 19 is of substantially the same diameter as the interior of the cylindrical section 20. The members 17 and 18 are cut to the desired length from longer stock bars of extruded metal, and are adapted to be united together with a continuous closed hinge joint by telescoping the cylindrical section 19 within the cylindrical section 20 which it closely fits as shown in Figs. 1 and 2. The sections 17 and 18 are thus united and relatively adjustable to different positions of angularity, and at the same time provide a continuous weatherproof joint from end to end.

The sections 17 and 18 are each provided with a section 21, which serves as an abutment or stop to limit the movement of the glass panes toward each other, by engaging the edges of the panes. The sections 17 and 18 respectively each form one jaw of a pair of clamping jaws for clamping the coupling to the edges of the panes of glass. The other or opposing clamping jaws 22 and 23 are formed from extruded metal bars and are provided with curved contact faces 24 and 25 which bear frictionally upon the exterior of the cylindrical section 20 when the coupling has been clamped in position to lock the coupling members against relative movement. A series of screws 26 are passed through perforations in the members 17 and 18 at spaced intervals and are threaded through threaded perforations in the sections 27 of jaw members 22 and 23 to clamp the jaws 17 and 22 and 18 and 23 in pairs rigidly upon the edges of the panes 15 and 16, there being a limited amount of resiliency in the jaw members and clamping members to evenly distribute the strain upon the various members so as not to pinch the glass excessively at any locality to an extent to be liable to fracture the glass. The heads of the screws 26 are located upon the inside or room side of the coupling, and the threaded ends of the screws do not appear upon the external face of the coupling. When the screws 26 are removed the coupling members may be inserted or removed and adjusted to position. After the screws 26 have been tightened the coupling members are held rigidly to their adjusted positions and clamp the edges of the panes together affording mutual support, and a weather proof joint between the panes.

The apparatus herein shown and described is capable of considerable modification within the scope of the claims without departing from the spirit of my invention.

What I claim is:

1. A store-front coupling comprising a pair of coupling jaw members adapted to engage one face of adjacent glass panes provided with telescopically engaging sections adapted to interengage said jaw members with a closed hinge joint, independent clamping jaw members adapted to engage opposite faces of said glass panes respectively and to frictionally engage one of said first mentioned coupling jaws, and means to draw said coupling jaw members and said friction jaw members together at intervals on opposite sides of the coupling joint.

2. A store-front coupling comprising a pair of coupling jaw members each adapted to engage adjacent faces of a pair of glass panes, said jaw members being provided with imperforate telescopically interengaging sections adapted to connect said jaw members with a closed hinge joint, independent jaw members adapted to engage opposite faces of said glass panes and to frictionally engage one of said first mentioned coupling jaws to rigidly lock said coupling members in their adjusted positions, and means to draw said coupling jaw members and said frictionally engaging jaw members together in pairs, to couple said panes together.

3. A store-front coupling comprising a pair of coupling jaw members adapted to engage one face of adjacent edges of a pair of glass panes and provided with telescopically engaging sections to couple said coupling jaws together with a closed hinge joint, a pair of locking jaws adapted to engage the opposite faces of said panes at one edge and provided with forked shoes to frictionally engage one of said coupling jaw members to lock said coupling to its adjusted position relative to said panes, and clamping screws threaded to the inside shoe members of said locking jaws to draw said coupling jaws and said locking jaws together upon the edges of the panes.

4. A store front coupling comprising a pair of coupling jaw members adapted to engage one face of adjacent edges of a pair of glass panes and provided with telescopically engaging sections to couple said coupling jaws together with a closed hinge joint, a pair of locking jaws adapted to engage the opposite faces of said panes at one edge and provided with forked shoes to frictionally engage one of said coupling jaw members to lock said coupling in its adjusted position relative to said panes, and clamping screws threaded to the inside shoe members of said locking jaws to draw said coupling jaws and said locking jaws and inside screw engaging members together.

5. In a store front coupling the combination of a pair of jaw members having at their adjacent longitudinal edges a pair of telescopically engaging hinge members providing an imperforate closed hinge connection therefor, a pair of independent jaw members cooperating one jaw with the hinged jaw members and contacting the exterior hinge portion of one of said first mentioned jaws and screw means extending through each of the first mentioned jaw members adjacent the telescopic portions and threadedly engaging said independent jaw members respectively whereby said independent jaw members may cooperate with their respective hinged members for clamping adjacent glass panes and for frictionally binding upon the telescopic portion whereby to retain it in adjusted position.

In testimony whereof I have affixed my signature.

FRANK L. MICHAELS.